Figure 1:
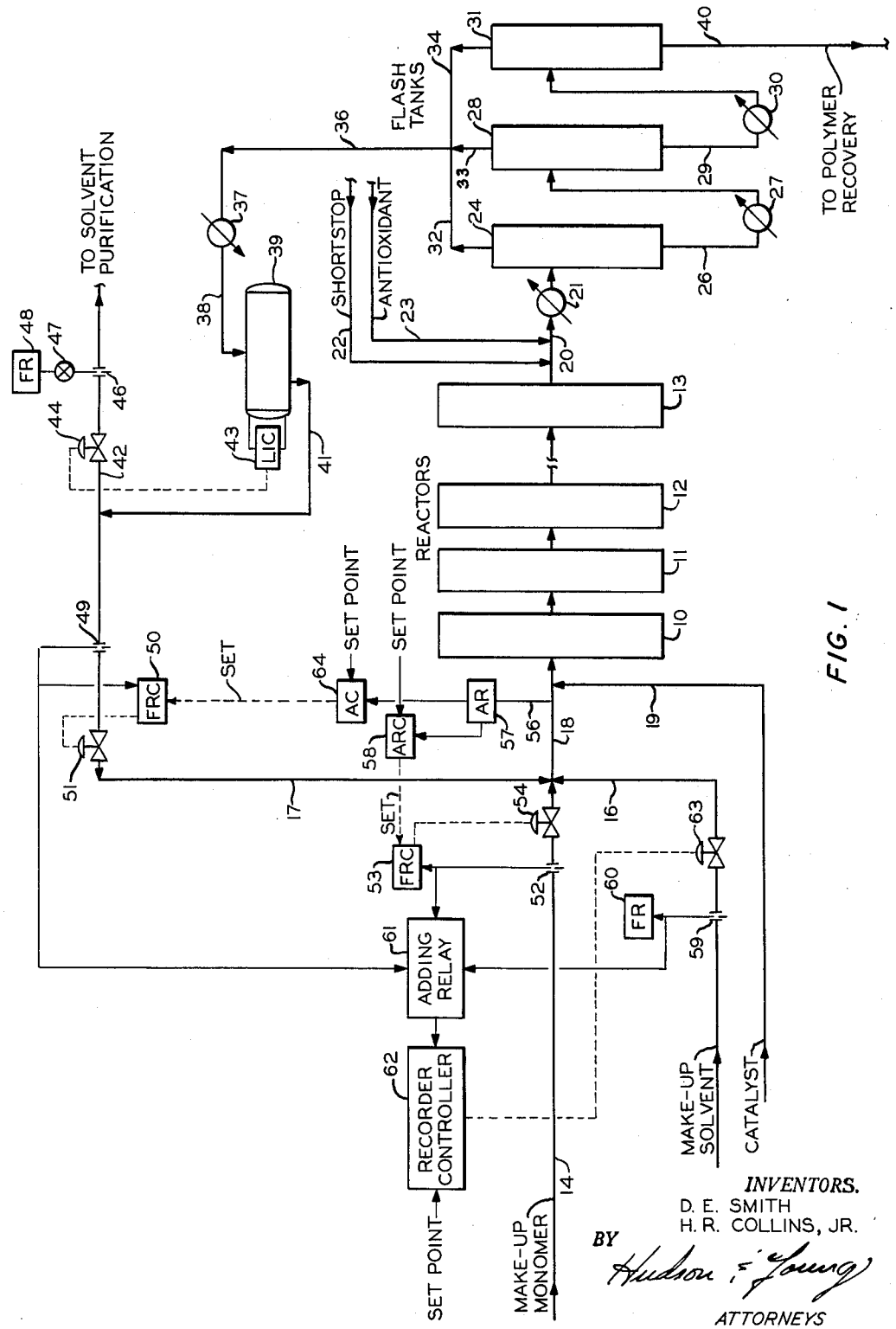

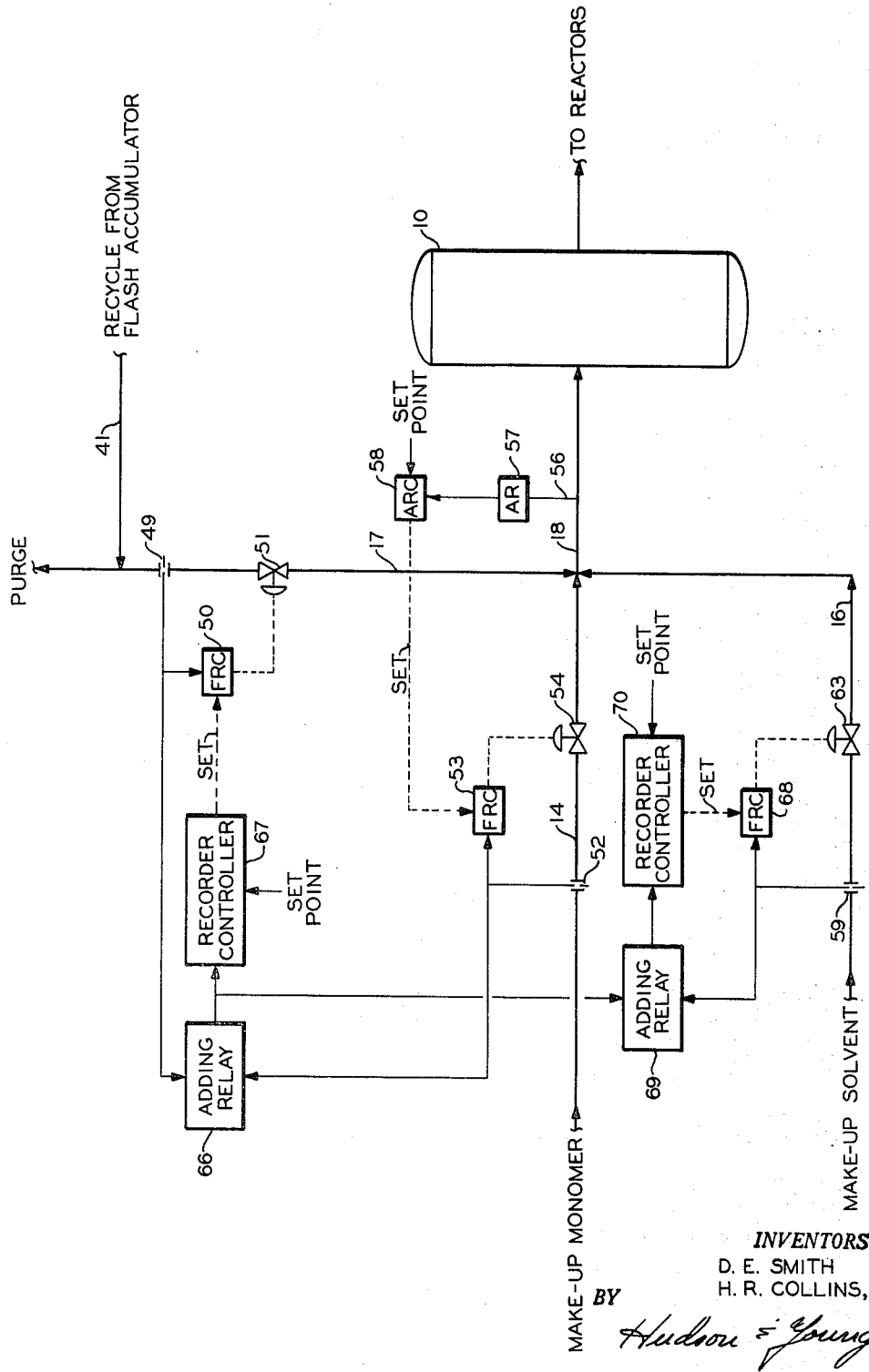

:::: {.columns}
::: {.column}
3,250,757
METHOD AND APPARATUS FOR CONTROLLING FEED TO A POLYMERIZATION REACTION
Dexter E. Smith and Henry R. Collins, Jr., Bartlesville, Okla., assignors to Phillips Petroleum Company, a corporation of Delaware
Filed May 18, 1961, Ser. No. 111,048
11 Claims. (Cl. 260—94.3)

This invention relates to a method and to apparatus for controlling the flow of feed materials to a polymerization reaction. In another aspect it relates to method and apparatus for regulating the flow rates of recycle and make-up streams of monomer and diluent to aid in stabilizing the conditions of a polymerization reaction.

In polymerization reactions and particularly in the catalytic polymerization of olefins to form normally solid polymers in the presence of an inert liquid reaction medium, the character of the product is affected considerably by the monomer concentration and the residence time of the reactants in the polymerization zone. It is desirable that measures be taken in order to stabilize the concentration of monomer in the feed materials and also to fix the total flow rate of feed materials to the reactors so that the residence time of the reactants is substantially constant. In some polymerization reactions the monomeric materials are not completely polymerized so that upon separation of the unreacted materials from the polymerization effluent a substantial portion of unreacted monomer and volatilized diluent is recovered for recycle to the polymerization zone. The utilization of this recycle material presents considerable problems in stabilizing the flow of feed materials to the polymerization reaction because such recycle streams tend to vary in volume and in composition.

According to the method and apparatus of our invention provision is made for stabilizing the flow of feed materials to a polymerization process when a recycle stream of monomer and diluent is used to make up a portion of this feed. According to one aspect of our invention the combined feed stream is analyzed for monomer content and the flow of make-up monomer is regulated to maintain a substantially constant monomer content in the combined feed stream. In combination with this control feature the flow rate of the recycle stream is regulated in order to maintain the sum of the flows of the recycle and make-up monomer streams substantially constant. In another aspect of our invention wherein a diluent make-up stream is also added to the total feed stream to the reaction zone, the flow rate of the diluent make-up stream is regulated in order to maintain the sum of the flow rates of the diluent and monomer make-up streams and recycle stream substantially constant. In yet another aspect of this invention the flow rate of the recycle stream is maintained constant independently of the other flow rates while the monomer make-up stream is regulated to maintain a substantially constant monomer content in the feed stream and the make-up diluent stream is regulated to maintain a substantially constant total flow of the monomer and solvent make-up streams and recycle stream. In still another aspect an improvement over the foregoing is provided for regulating the flow of the recycle stream in response to a measurement of inert components in the total feed stream. Inert materials, such as low boiling paraffins or monoolefins in the polymerization of conjugated dienes, for example, are frequently introduced with the make-up monomer and are accumulated in the recycle stream, a portion of which is purged to prevent buildup of these inert components in the reaction zone. The last described aspect of our invention permits the maximum utilization of this recycle stream without building up undesirable amounts of inert components in the reaction zone.
:::

::: {.column}
It is an object of our invention to provide both method and apparatus for controlling the flow of feed streams to a polymerization reaction. Another object is to maintain a substantially constant monomer concentration and total flow rate for the combined feed materials when employing a substantial recycle stream of unreacted monomer and diluent. Another object is to enable the control of the feed materials of monomer and diluent in a predetermined ratio in a manner which is independent of the flow rate of a recycle stream which is subject to considerable variation. Still another object is to provide a control system and method for a polymerization reaction which permits maximum utilization of recycle materials without buildup of undesirable quantities of inert components present in the recycle stream. Other objects, advantages and features of our invention will be apparent to those skilled in the art from the following discussion and drawing in which:

FIGURE 1 is a schematic flow diagram of a polymerization reaction with flash recovery of unreacted materials showing a preferred control combination for regulating the rates of flow of feed materials to the reaction zone; and FIGURE 2 is a schematic diagram showing only the feed portion of the overall reaction system and illustrating an embodiment of another aspect of our invention.

Referring now to FIGURE 1, reactors 10, 11, 12 and 13 are shown connected in series for carrying out the polymerization reaction. While four reactors are shown it should be understood that more or fewer reactors can be employed, depending upon the design capacity of the reactors and the desired residence time for the polymerization reaction. Monomer in conduit 14, solvent in conduit 16, and recycle material which is predominantly monomer and solvent in conduit 17 are combined in conduit 18 and fed to reactor 10, the first reactor in the series. Catalyst for the reaction is also added via conduit 19 to this feed stream in conduit 18. The polymerization effluent from the last reactor in the series, reactor 13, is removed through line 20 and passed to heat exchanger 21. Various additives can be injected into the polymerization effluent in conduit 20, for example, a shortstop or catalyst inactivating agent to terminate the polymerization reaction, is injected into conduit 20 by way of conduit 22. Also an antioxidant is injected via conduit 23. The effluent stream is then heated in heat exchanger 21 and passed to flash tank 24 where the pressure on the mixture is reduced and reacted monomer together with some of the solvent is vaporized. The unvolatilized residue together with polymer is passed from flask tank 24 via conduit 26 and heat exchanger 27 to flask tank 28. This material is repressurized in conduit 26 by a pump, not shown, and the pressure is again reduced in flask tank 28 so that the heat added in heat exchanger 27 causes a portion of the solvent to vaporize together with more of the unreacted monomer. This operation is repeated with the unvolatilized material being removed through conduit 29 and passing through heat exchanger 30 to the final flash step in tank 31. More solvent is vaporized together with any remaining unreacted monomer and the vapors pass overhead from flash tanks 24, 28 and 31 through conduits 32, 33 and 34 respectively. These vapors are combined in header 36 and passed to condenser 37 where they are condensed and the condensate passes through conduit 38 to accumulator 39. The unvaporized solvent together with the polymer is removed from flash tank 31 through conduit 40 and passed to further polymer recovery steps which are not shown in this drawing since they are not essential to an understanding of our invention. A constant inventory is maintained in vessels 24, 28 and 31 by liquid level controllers, not shown.
:::
::::

Condensate from accumulator 39 is withdrawn via conduit 41. A portion of this condensate is purged from the polymerization system by passing it to a solvent purification step via conduit 42. Liquid level controller 43 on accumulator 39 is operably connected to motor valve 44 in conduit 42 so that the flow of condensate through line 42 can be regulated in order to maintain a substantially constant liquid level in the accumulator vessel. Flow through line 42 is sensed by flow sensing element 46 and the associated transducer 47 produces a signal which is transmitted to flow recorder 48. The remainder of the condensate in line 41 is recycled to the reaction by way of conduit 17 as previously described.

The flow in conduit 17 is sensed by flow sensing element 49 which transmits a signal to flow recorder 50 operably connected to motor valve 51 in conduit 17 so that the flow of recycle materials in conduit 17 is thereby maintained substantially constant. In one embodiment of our invention a predetermined set point is established manually for flow controller 50. Flow sensing element 52 in conduit 14 transmits a signal as a function of the flow through this conduit to flow recorder controller 53 which is operably connected to motor valve 54 in conduit 14. The flow of make-up monomer through conduit 14 is thereby maintained at a substantially constant predetermined value established by the set point of flow recorder controller 53. The flow sensing elements can be of any conventional variety but turbine type flowmeters are preferred. These flowmeters can be calibrated to produce outputs proportional to the mass (gravimetric) rate of flow of the measured stream.

A sample of the feed stream in conduit 18 is passed by way of sample line 56 to analyzer recorder 57 which is an instrument capable of measuring the concentration of monomer in the feed stream, for example, the concentration of butadiene in a stream of toluene. A number of well known analyzers such as infrared analyzers, ultraviolet analyzers, differential refractometers, or mass spectrometers can be used for this service although a gas phase chromatographic analyzer, such as described in U.S. Patent 2,943,702 to Hudson et al., is preferred. An example of a suitable instrument commercially available is a Perkin-Elmer Model 184 Process Fractometer modified for liquid sampling as described in U.S. Patent 2,757,541 to Watson et al. For 0 to 10 percent butadiene in toluene streams we prefer to use such an instrument with a control unit as described in copending application Serial No. 777,995 of M. C. Burk, filed December 3, 1958, now U.S. Patent 3,094,862, and a Philbrick USA–4JT operational amplifier or similar integrator for obtaining butadiene peak area. The output is a quantitative measurement of butadiene concentration on a 2 minute analysis cycle.

Analyzer 57 produces a signal which is a function of the concentration of monomer in the feed stream in conduit 18. This signal is transmitted to recorder controller 58 which in turn is connected to manipulate the set point of flow recorder controller 53. The set point of analysis recorder controller 58 is the desired monomer concentration in the feed stream. It can be seen, therefore, that if the monomer concentration in the feed stream tends to decrease, this change is sensed by analyzer 57 and a signal is transmitted to controller 58 which senses the deviation of the monomer content from the desired value established as its set point. This deviation causes a manipulation of the set point of controller 53 so that a higher feed rate of make-up monomer is required by this controller and thereby the concentration of the monomer in the feed stream is returned to its desired value.

The flow of make-up diluent in conduit 16 is sensed by flow sensing element 59 which transmits a signal as a function of this rate of flow to flow recorder 60 and to adding relay 61. Adding relay 61 also receives a signal from flow sensing element 49. This signal is a function of the flow of recycle material through conduit 17. Relay 61 also receives a signal from flow sensing element 52. This signal is a function of make-up monomer flow through conduit 14. Adding relay 61 produces a signal which is a function of the sum of the signals received from flow sensing elements 49, 52 and 59. This summation signal is transmitted to recorder controller 62 which has as its set point the desired total flow of these three feed streams. Recorder controller 62 is operably connected to motor valve 63 in conduit 16. Thus, the flow rate of the make-up diluent is regulated in order to maintain the total flow of the recycle and make-up stream substantially constant. As in the situation discussed above, where an increase in the monomer make-up flow rate is required in order to offset a decrease in the monomer concentration of the total feed stream, a corresponding decrease in the solvent flow rate is automatically made in order to maintain the total flow rate of the feed stream in conduit 18 at a substantially constant value.

According to another aspect of our invention analyzer 57 analyses not only for the monomer content in feed stream 18 but also for the content of inert materials, for example, low boiling hydrocarbons which are vaporized in the flash vessels and returned with the recycle stream but which do not enter into the reaction under the conditions maintained. In this embodiment analyzer 57 transmits a second signal to analysis controller 64 as a function of the concentration of the inert components in the feed stream 18. Controller 64 is connected to manipulate the set point of flow recorder 50 which in turn regulates the flow of recycle materials through conduit 17. According to this arrangement the maximum allowable concentration of inert components in the feed stream can be established as the set point for controller 64. The recycle flow, therefore, is always at the maximum value permissible for this maximum concentration of inert components in the feed materials to the reactor. Since low boiling inert components are introduced with the make-up monomer stream and are removed only through the purge stream in conduit 42, it can be seen that these inert components are passed to the reaction zone primarily by way of the recycle stream. According to this embodiment, as the concentration of inert components tends to become too high in the feed stream, the amount of recycle material is correspondingly reduced which in turn passes more of the return condensate from accumulator 39 to solvent purification steps. This reduction in recycle flow likewise calls for an increase in the flow rate of make-up diluent which will ordinarily result in a reduced analysis of monomer content in the feed stream, thereby demanding a higher flow rate of make-up monomer. A balance is ultimately achieved in which the net result is that the recycle stream is reduced and the flow rates of both the make-up monomer and make-up diluent streams are increased. Should the concentration of these inert components become lower than can be tolerated, the flow rate of the recycle stream is increased with a corresponding decrease in the flow rates of the make-up streams. There are several reasons for desiring that the flow rate of the recycle stream be as high as permissible. The most obvious of these is that the requirements for fresh monomer and diluent are thereby decreased and less load is passed on to the solvent purification steps. Also since the recycle materials have been through the reaction they are essentially free of catalyst poisons; therefore, reuse of this material enables maximum utilization of the catalyst.

Other aspects of our invention are illustrated in FIGURE 2. In FIGURE 2 the features which are identical to those discussed in connection with FIGURE 1 are indicated by the same reference numerals as used in FIGURE 1. In this embodiment the flow rate of monomer through conduit 14 is regulated in response to an analysis measurement for monomer in the feed stream in conduit 18 as previously described. The signal from flow sensing element 52, however, is transmitted to adding relay 66 together with the signal from flow sensing element 49 in conduit 17. A signal is produced from relay 66 which is a function of the sum of these signals from elements 49 and 52, which are functions of the flow rates of the recycle stream and of the make-up monomer stream, respectively. This signal from relay 66 is transmitted to recorder controller 67 which has as its set point the desired total flow of the make-up monomer and the recycle stream. Controller 67 manipulates the set point of flow controller 50 which in turn regulates the flow of the recycle stream through conduit 17. According to this embodiment of our invention, therefore, if an increase in the monomer make-up flow rate is required in order to offset a decrease in the monomer concentration of the feed stream in conduit 18, a corresponding decrease is made in the recycle flow rate in conduit 17 so that the sum of the recycle and monomer make-up flow rates is constant. In this embodiment the flow of make-up diluent through conduit 16 is maintained substantially constant by flow recorder controller 68 which receives a flow signal from flow element 59 and is operably connected to motor valve 63 in conduit 16. The set point of this controller can be established manually at a desired constant value or manipulated as will be subsequently described.

As an improvement over the above-described embodiment, the summation signal from adding relay signal 66 together with the signal from flow element 59 in the make-up diluent conduit is transmitted to adding relay 69 which produces a signal which is a function of the sum of the flow rates of the make-up diluent stream, the make-up monomer stream and the recycle stream. This signal is transmitted to recorder controller 70 which has as its set point the desired total value for the flow rates of these three streams. Controller 70 in turn manipulates the set point of flow controller 68 so that as necessary the flow rate of the make-up diluent is increased to offset an unavoidable decrease in the total flow rates of the make-up monomer and recycle streams. Ordinarily this total flow rate of the make-up monomer and recycle streams is substantially constant so that there is no need to adjust the flow rate of the make-up diluent stream. Upsets in the system which cannot be momentarily controlled can occur, however, such as a loss in the cooling capacity of the flash overhead condenser, or the removal of one or more of the flash concentrators from service. If the reactor effluent is temporarily sent to storage rather than to the flash concentrators in order to permit a temporary repair, the flow rate of the recycle stream would necessarily drop below a value within the control limits of the controller 50. For example, if valve 51 is wide open and the total flow rates of the recycle stream and make-up monomer are still not sufficient to satisfy the desired total flow of feed material through conduit 18, the embodiment now described enables the total flow rate to be established by additional solvent introduced through conduit 16. This in turn will result in a decrease in monomer concentration in the feed stream. An increase in the flow rate of the make-up monomer follows so that an ultimate balance is achieved with the desired concentration of monomer in the feed stream at its desired flow rate independently of the recycle stream introduced into conduit 17.

An example of our invention will now be described in connection with a polymerization of butadiene in a toluene solvent employing a catalyst formed from triisobutylaluminum, titanium tetrachloride, and iodine. It is pointed out that an object of our invention is to provide a feed stream to the first reactor of the series which is substantially constant in total flow and also in the concentration of monomer in the solvent. In this example the desired total flow of feed materials is 157,531 pounds per hour of which 7.66 weight percent is butadiene. Under a normal set of circumstances this feed stream is made up from a combination of a make-up monomer stream of 8,733 pounds per hour, substantially all of which is butadiene, a constant make-up solvent stream of 70,544 pounds per hour substantially all of which is toluene, and a recycle stream of 78,254 pounds per hour of which 4.48 weight percent is butadiene and 94.93 weight percent is toluene. Referring to FIGURE 2, these flow rates of the recycle, monomer and solvent streams are maintained substantially constant by controllers 50, 53 and 68, respectively. Assume now that because of a change in butadiene conversion or a change in the flash conditions the composition of the recycle stream is changed to 5.77 percent butadiene and 93.72 percent toluene. At the established flow rate this tends to increase the concentration of butadinene in the feed stream which if not corrected would ultimately produce a feed stream containing 8.30 percent butadiene rather than the desired concentration. The initial deviation in butadiene concentration is sensed, however, by analyzer 57 and controller 58 so that the flow rate of make-up monomer is reduced. This change in the monomer make-up flow rate is sensed by flow element 52 and a signal proportional to this flow is transmitted to relay 66 together with a signal proportional to the flow of recycle material through conduit 17. Since the desired sum of these rates is 86,987 pounds per hour, the set point of controller 50 is manipulated by controller 67 to maintain a new higher flow rate of recycle stream 17. Since this, in turn, produces another change in the monomer concentration of stream 18, an additional correction is required and an ultimate equilibrium is established by the operation of this combination of control features so that in the net result the flow rate of the make-up monomer stream is 7,642 pounds per hour, and the flow rate of the recycle stream is 79,345 pounds per hour and the concentration of butadiene in the reactor feed stream is held at the desired value.

To illustrate another embodiment of our invention as shown in FIGURE 2, assume now that there is a temporary interruption in the recycle flow through conduit 41 so that the flow of material through conduit 17 drops to zero. This tends to produce a corresponding increase in the monomer concentration in the feed stream 18 which in turn causes the flow rate of make-up monomer in conduit 14 to be reduced, likewise reducing the total flow rates of make-up monomer and recycle stream as transmitted by adding relay 66 to adding relay 69. Since the sum of the total flow rates is thus drastically reduced, controller 70 manipulates the set point of flow controller 68 so that the required flow rate of make-up toluene in conduit 16 is increased. This tends to produce a decrease in the butadiene concentration in conduit 18 so that an equilibrium is ultimately established whereby the total flow is provided by the make-up streams of butadiene and toluene in conduits 14 and 16 respectively. These adjusted flow rates are 12,313 pounds per hour of make-up butadiene and 145,218 pounds per hour of make-up toluene providing a total feed rate in conduit 18 of 157,531 pounds per hour with the required butadiene concentration.

The following example illustrates a preferred embodiment as shown in FIGURE 1 with the total flow rate of feed material in conduit 18 established at 157,531 pounds per hour with a butadiene concentration of 7.66 weight percent. This feed stream is a combination of the make-up butadiene stream of 8,733 pounds per hour which is 98 weight percent butadiene and the remainder is butenes and isobutylene, a make-up toluene stream of 70,544 pounds per hour which is essentially 100 percent toluene, and a recycle stream of 78,254 pounds per hour which is 4.48 weight percent butadiene, 94.93 weight percent toluene and the remainder butylenes. The concentration of butylenes in the feed stream of conduit 18 is, therefore, 0.40 weight percent which is the assumed maximum permissible value. Assume now that the concentration of butadiene in the butadiene make-up stream changes to 99 weight percent. The flow rate of the recycle stream is maintained constant so that the concentration of butadiene in the feed stream tends to be altered and would ultimately become 7.71 weight percent if not corrected. This deviation in butadiene content is sensed, however, and changes are automatically made in the flow rate of the make-up butadiene in conduit 14. The total flow of the make-up monomer and solvent and the recycle stream tends to change as indicated by adding relay 61 so that controller 62 makes an adjustment in the flow of make-up toluene in conduit 16 and an equilibrium tends to be established in which the make-up butadiene flow rate is 8,646 pounds per hour and the make-up toluene flow rate is 70,637 pounds per hour.

In the meantime, however, the concentration of the butylenes in the make-up butadiene stream has dropped to 1 weight percent. According to the preferred aspect of our invention as illustrated in FIGURE 1 this reduction in butylene concentration in the make-up butadiene stream tends to produce a corresponding reduction in the butylene concentration of the feed stream to the reactors. Since a concentration of approximately 0.40 weight percent can be tolerated in the feed stream, analyses of the butylene concentration by analyzer 57 which transmits a signal to controller 64 permits the set point of controller 50 to be manipulated to call for an increased flow rate of recycle material. An increase in the flow of recycle material tends to increase the flow rate of the feed stream so that there is a corresponding decrease in the flow rate of make-up toluene. An ultimate equilibrium is established using these control features in which the recycle stream is 94,398 pounds per hour, the make-up butadiene stream is 7,919 pounds per hour and the make-up toluene stream is 55,214 per hour. The advantages of employing all of the recycle stream possible have been previously pointed out.

While the conditions and proportions of the above examples have been presented to illustrate our invention they should be accepted as typical only and not construed to limit our invention unduly. As will be apparent to those skilled in the art from the above disclosure various modifications can be made in our invention without departing from the spirit or scope thereof. Although the combination of apparatus features as above described is novel, the individual control components are well known and commercially available. Standard flow recorder controllers can be used such as the Foxboro M–40 as described in this company's catalogue 5A–10A, November 1955. While turbine flowmeters such as manufactured by Cox Instruments, a Division of Geo. L. Nankervis Co., Detroit, Mich. (Bulletin 1314, 1960), are preferred, standard orifice meters can be used. Since the output of the turbine flowmeter is in electrical voltage transducers may be required to convert this signal to amperage and pneumatic potential. Such current/pneumatic transducers are well known. The adding relays can be pneumatic, electric or mechanical. A Foxboro adding relay M–56 or a Sorteberg Force Bridge (Catalogue C 80–1, December 1958) are suitable pneumatic relays while electrical components are available from Geo. A. Philbrick Researchers, Inc. or Electronic Associates, Inc. The analyzer, as previously described, is preferably chromatographic and can be adapted to determine the concentration of two or more components, such as butadiene and butylenes, in a stream. A "peak reader" such as described in Chemical Engineering. vol. 66, p. 34, November 2, 1959, or I.S.A. Journal, vol. 9, p. 28, October 1958, can be used to produce a suitable output or employed with a transducer if required.

We claim:

1. In a polymerization process wherein a return stream is divided into a purge stream and a recycle stream whereby increase of the flow of the recycle stream will cause decrease of the flow of the purge stream, and decrease of the flow of the recycle stream will cause increase of the flow of the purge stream, said recycle stream of monomer and diluent, a monomer make-up stream and a diluent make-up stream are combined to produce a feed stream which is passed to a reaction zone, the feed control method which comprises analyzing said feed stream for monomer content, manipulating the flow rate of said monomer make-up stream to maintain said monomer content in said feed stream substantially constant, maintaining the flow rate of said recycle stream substantially constant, and manipulating the flow rate of said diluent make-up stream to maintain the sum of the flow rates of said recycle, monomer make-up, and diluent make-up streams substantially constant.

2. In a polymerization process wherein a return stream is divided into a purge stream and a recycle stream whereby increase of the flow of the recycle stream will cause decrease of the flow of the purge stream, and decrease of the flow of the recycle stream will cause increase of the flow of the purge stream, said recycle stream of monomer and diluent, a monomer make-up stream and a diluent make-up stream are combined to produce a feed stream which is passed to a reaction zone, the feed control method which comprises sensing the flow rates of said recycle, monomer make-up and diluent make-up streams and producing first, second and third control signals respectively as a function of said flow rates, maintaining the flow of said recycle stream at a substantially constant predetermined value in response to said first signal, maintaining the flow rate of said monomer make-up stream at a substantially constant predetermined value in response to said second signal, maintaining the flow rate of said diluent make-up stream at a substantially constant, predetermined value in response to said third signal, analyzing said feed stream for monomer content, producing a fourth signal as a function of said monomer content in said feed stream, regulating said predetermined value of monomer make-up flow rate in response to said fourth signal thereby to maintain the concentration of monomer in said feed stream substantially constant, producing a fifth signal as a function of the sum of said first, second and third signals, and manipulating said predetermined value of said make-up diluent flow rate in response to said fifth signal thereby maintaining the flow rate of said feed stream substantially constant.

3. The process of claim 2 wherein said monomer is a conjugated diolefin having 4–12 carbon atoms per molecule and said diluent is a normally liquid hydrocarbon solvent.

4. In a process wherein butadiene is continuously polymerized in a reaction zone in the presence of an organometal catalyst and in a toluene reaction medium, the reaction effluent is flashed to vaporize unreacted butadiene and some of the toluene and form therewith a return stream, the unvolatilized toluene and polybutadiene dissolved therein is passed to polymer recovery steps, the vapor return stream is condensed, a portion of the return stream condensate is purged and the remainder forms a recycle stream for return to said reaction zone, a make-up butadiene stream and a make-up toluene stream are combined with said recycle stream to form a feed stream which is passed to said reaction zone, the improved feed control method which comprises sensing the flow rate of said butadiene make-up stream, producing a first signal as a function of said butadiene flow rate, maintaining said flow rate of said butadiene make-up stream at a substantially constant predetermined value in response to said first signal, analyzing said combined feed stream for butadiene content, producing a second signal as a function of said butadiene content, manipulating said predetermined value for butadiene make-up flow rate in response to said second signal, sensing the flow rate of said recycle stream, producing a third signal as a function of said recycle flow rate, maintaining said flow rate of said recycle stream at a substantially constant predetermined value in response to said third signal, sensing the flow rate of said make-up toluene stream, producing a fourth signal as a function of said toluene flow rate, producing a fifth signal as a function of the sum of said first, third and fourth signals, and regulating the flow rate of said toluene make-up stream in response to said fifth signal thereby maintaining the flow rate of said combined feed stream substantially constant.

5. In a polymerization process wherein a return stream is divided into a purge stream and a recycle stream whereby increase of the flow of the recycle stream will cause decrease of the flow of the purge stream, and decrease the flow of the recycle stream will cause increase of the flow of the purge stream, said recycle stream of monomer, diluent and inert components, a monomer make-up stream containing inert components, and a diluent make-up stream are combined to produce a feed stream which is passed to a reaction zone, the feed control method which comprises analyzing said feed stream to determine the monomer content and content of inert components, manipulating the flow rate of said monomer make-up stream to maintain said monomer content in said feed stream substantially constant, manipulating the flow rate of said recycle stream to maintain said content of inert components in said feed stream substantially constant, and manipulating flow rate of said diluent make-up stream the sum of flow rates of said monomer make-up, recycle, and diluent make-up streams substantially constant.

6. In a polymerization process wherein a return stream is divided into a purge stream and a recycle stream whereby increase of the flow of the recycle stream will cause decrease of the flow of the purge stream, and decrease of the flow of the recycle stream will cause increase of the flow of the purge stream, said recycle stream of monomer, diluent and inert components, a monomer make-up stream containing inert components, and a diluent make-up stream are combined to produce a feed stream which is passed to a reaction zone, the feed control method which comprises sensing the flow rate of said monomer make-up stream, producing a first signal as a function of said monomer stream flow rate, regulating said flow rate of said monomer stream at a substantially constant predetermined value in response to said first signal, analyzing said feed stream to determine monomer content and content of inert components, producing a second signal as a function of the concentration of monomer in said feed stream, regulating said predetermined value of monomer stream flow rate in response to said second signal, producing a third signal as a function of the concentration of inert components in said feed stream, sensing the flow rate of said recycle stream, producing a fourth signal as a function of said recycle flow rate, regulating said rate of flow of said recycle stream substantially constant at a predetermined value in response to said fourth signal, manipulating said predetermined value of said recycle rate of flow in response to said third signal, sensing the rate of flow of said make-up solvent stream, producing a fifth signal as a function of said solvent flow rate, producing a sixth signal as a function of the sum of said first, fourth and fifth signals, and regulating the rate of flow of said solvent make-up stream in response to said sixth signal thereby maintaining the flow rate of said recycle stream at a maximum allowable value and the flow rate of said feed stream substantially constant.

7. The process of claim 6 wherein said monomer is butadiene, said diluent is toluene and said inert components are butylenes.

8. Apparatus for control of feed materials to a polymerization reaction wherein a monomer make-up stream and a recycle stream containing monomer and diluent, said recycle stream being formed from a return stream by splitting said return stream into a purge stream and a recycle stream, are combined to produce a feed stream comprising, in combination, means for continuously analyzing a sample of said feed stream for monomer content, means associated with said analyzing means for producing a first signal as a function of said monomer content, means for regulating the flow rate of said monomer make-up stream in response to said first signal operably connected to receive said first signal, first flow sensing means in said monomer make-up stream; for producing a second signal as a function of said make-up monomer flow rate, second flow sensing means in said recycle stream for producing a third signal as a function of the flow rate of said recycle stream, signal summing means for producing a fourth signal as a function of the sum of said second and third signals connected to receive said second and third signals, and means for regulating the flow rate of said recycle stream in response to said fourth signal connected to receive said fourth signal.

9. Apparatus for control of feed materials to a polymerization reaction wherein a monomer make-up stream, a recycle stream containing monomer and diluent said recycle stream being formed from a return stream by splitting said return stream into a purge stream and a recycle stream, and a diluent make-up stream are combined to produce a feed stream comprising, in combination, means for continuously analyzing a sample of said feed stream for monomer content, means associated with said analyzing means for producing a first signal as a function of said monomer content, means for regulating the flow rate of said monomer make-up stream in response to said first signal connected to receive said first signal, first flow sensing means in said monomer make-up stream for producing a second signal as a function of said make-up monomer flow rate, second flow sensing means in said recycle stream for producing a third signal as a function of the flow rate of said recycle stream, signal summing means for producing a fourth signal as a function of the sum of said second and third signals connected to receive said second and third signals, means for regulating the flow rate of said recycle stream in response to said fourth signal connected to receive said fourth signal, third flow sensing means in said diluent make-up stream for producing a fifth signals as a function of the flow rate of said diluent make-up stream, second signal summing means for producing a sixth signal as a function of the sum of said fifth, second and third signals connected to receive said fifth and fourth signals, and means for regulating the flow rate of said diluent make-up stream in response to said sixth signal connected to receive said sixth signal.

10. Apparatus for control of feed materials to a polymerization reaction wherein a monomer make-up stream, a recycle stream containing monomer and diluent, said recycle stream being formed from a return stream by splitting said return stream into a purge stream and a recycle stream, and a diluent make-up stream are combined to produce a feed stream comprising, in combination, means for continuously analyzing a sample of said feed stream for monomer content, means associated with said analyzing means for producing a first signal as a function of said monomer content, means for regulating the flow rate of said monomer make-up stream in response to said first signal connected to receive said first signal, first flow sensing means in said monomer make-up stream for producing a second signal as a function of said make-up monomer flow rate, second flow sensing means in said recycle stream for producing a third signal as a function of the flow rate of said recycle stream, means for regulating said flow rate of said recycle stream at a substantially constant value in response to said third signal connected to receive said third signal, third flow sensing means in said diluent make-up stream for producing a fourth signal as a function of the flow rate of said diluent make-up stream, signal summing means for producing a fifth signal as a function of the sum of said second, third and fourth signals connected to receive said second, third and fourth signals, and means for regulating the flow of said diluent make-up stream in response to said fifth signal connected to receive said fifth signal.

11. Apparatus for control of feed materials to a polymerization reaction wherein a monomer make-up stream containing inert components, a diluent make-up stream, and a recycle stream containing monomer, diluent and inert components, said recycle stream being formed from a return stream by splitting said return stream into a purge stream and a recycle stream, are combined to produce a feed stream comprising, in combination means for continuously analyzing a sample of said feed stream for content of monomer and content of inert components, means associated with said analyzing means for producing a first signal as a function of said monomer content, means associated with said analyzing means for producing a second signal as a function of the content of inert components in said feed stream, means for regulating the flow rate of said monomer make-up stream in response to said first signal connected to receive said first signal, means for regulating the flow rate of said recycle stream in response to said second signal connected to receive said second signal, first flow sensing means in said monomer make-up stream for producing a third signal as a function of said monomer make-up stream flow rate, second flow sensing means in said recycle stream for producing a fourth signal as a function of the flow rate of said recycle stream, third flow sensing means in said diluent make-up stream for producing a fifth signal as a function of the diluent make-up stream flow rate, signal summing means for producing a sixth signal as a function of the sum of said third, fourth and fifth signals connected to receive said third, fourth and fifth signals, and means for regulating said flow rate of said diluent make-up stream in response to said sixth signal connected to receive said sixth signal.

References Cited by the Examiner

UNITED STATES PATENTS

| | | | |
|---|---|---|---|
| 2,881,235 | 4/1959 | Van Pool | 260—683.48 |
| 2,996,492 | 8/1961 | Tegge et al. | 260—93.7 |
| 3,018,310 | 1/1962 | Van Pool | 196—132 |
| 3,099,648 | 7/1963 | Dye | 260—94.3 |

JOSEPH L. SCHOFER, *Primary Examiner.*

MORRIS LIEBMAN, *Examiners.*

D. E. OLSEN, F. L. DENSON, *Assistant Examiners.*